(12) United States Patent
Yun et al.

(10) Patent No.: US 7,489,461 B2
(45) Date of Patent: Feb. 10, 2009

(54) DISK DRIVE, MEDIUM AND METHOD OF COMPENSATING FOR A WRITE PARAMETER

(75) Inventors: Jong-yun Yun, Suwon-si (KR); Joo-won Cho, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 483 days.

(21) Appl. No.: 11/241,967

(22) Filed: Oct. 4, 2005

(65) Prior Publication Data

US 2006/0072229 A1 Apr. 6, 2006

(30) Foreign Application Priority Data

Oct. 5, 2004 (KR) ...................... 10-2004-0079242

(51) Int. Cl.
G11B 27/36 (2006.01)
G11B 5/09 (2006.01)
G11B 20/10 (2006.01)

(52) U.S. Cl. .......................................... 360/31; 360/39
(58) Field of Classification Search ....................... None
See application file for complete search history.

(56) References Cited

U.S. PATENT DOCUMENTS

| 5,774,285 | A | | 6/1998 | Kassab et al. |
|---|---|---|---|---|
| 6,201,653 | B1 | | 3/2001 | Contreras et al. |
| 7,110,197 | B2 | * | 9/2006 | Cho .............................. 360/31 |
| 2003/0081339 | A1 | * | 5/2003 | Barnett et al. .................. 360/67 |
| 2005/0146803 | A1 | * | 7/2005 | Kim et al. ....................... 360/53 |

FOREIGN PATENT DOCUMENTS

| JP | 05-282607 | 10/1993 |
|---|---|---|
| JP | 07-161137 | 6/1995 |
| KR | 1020030021679 | 3/2003 |
| KR | 98-4788 | 7/2003 |

* cited by examiner

*Primary Examiner*—Joseph H Feild
*Assistant Examiner*—Daniell L Negrón
(74) *Attorney, Agent, or Firm*—Staas & Halsey LLP

(57) ABSTRACT

A disk drive, medium, and method controlling a write parameter of a disk drive are provided. The method of compensating for a write parameter, in order to control a write operation of a disk drive, can includes measuring a bit error rate in an optimum write condition and a bit error rate in a weak write condition for a head, and calculating a compensation value for a write parameter corresponding to a difference between the bit error rates in an optimum write condition and the bit error rate in the weak write condition. In a method, according to embodiments of the present invention, a compensation value alpha for compensating a write parameter for a predetermined period of time after the start of a write operation can be generated to prevent a weak write phenomenon at the beginning of the write operation.

11 Claims, 15 Drawing Sheets

DIRECTION OF ROTATION OF HARD DISK

ROTATION DIRECTION OF ROTATION OF HARD DISK

FIG. 15

| RCO_BER | ERROR COUNT CRITERIA | | | WW_BER (TS_BER) | | |
|---|---|---|---|---|---|---|
| | EC_max | EC_mid | EC_min | BER_max | BER_mid | BER_min |
| −3.62 | 239780 | 239780 | 239780 | −3.62 | −3.62 | −3.62 |
| −3.80 | 239780 | 239780 | 205974 | −3.62 | −3.62 | −3.69 |
| −4.00 | 239780 | 239780 | 131769 | −3.62 | −3.62 | −3.88 |
| −4.20 | 239780 | 165887 | 84297 | −3.62 | −3.78 | −4.07 |
| −4.40 | 239780 | 109600 | 53928 | −3.62 | −3.96 | −4.27 |
| −4.60 | 208839 | 72412 | 34499 | −3.68 | −4.14 | −4.46 |
| −4.80 | 144481 | 47842 | 22070 | −3.84 | −4.32 | −4.66 |
| −5.00 | 99957 | 31609 | 14119 | −4.00 | −4.50 | −4.85 |
| −5.20 | 69153 | 20884 | 9033 | −4.16 | −4.68 | −5.04 |
| −5.40 | 47842 | 13798 | 5778 | −4.32 | −4.86 | −5.24 |
| −5.60 | 33099 | 9116 | 3697 | −4.48 | −5.04 | −5.43 |
| −5.80 | 22899 | 6023 | 2365 | −4.64 | −5.22 | −5.63 |
| −6.00 | 15842 | 3979 | 1513 | −4.80 | −5.40 | −5.82 |
| −6.20 | 10960 | 2629 | 968 | −4.96 | −5.58 | −6.01 |
| −6.40 | 7582 | 1737 | 619 | −5.12 | −5.76 | −6.21 |
| −6.60 | 5246 | 1148 | 396 | −5.28 | −5.94 | −6.40 |
| −6.80 | 3629 | 758 | 253 | −5.44 | −6.12 | −6.60 |
| −7.00 | 2511 | 501 | 162 | −5.60 | −6.30 | −6.79 |
| −7.20 | 1737 | 331 | 104 | −5.76 | −6.48 | −6.98 |
| −7.40 | 1202 | 219 | 66 | −5.92 | −6.66 | −7.18 |
| −7.60 | 831 | 144 | 42 | −6.08 | −6.84 | −7.37 |
| −7.80 | 575 | 95 | 27 | −6.24 | −7.02 | −7.57 |
| −8.00 | 398 | 63 | 20 | −6.40 | −7.20 | −7.70 |
| −8.20 | 275 | 42 | 20 | −6.56 | −7.38 | −7.70 |
| −8.40 | 190 | 28 | 20 | −6.72 | −7.56 | −7.70 |
| −8.60 | 132 | 20 | 20 | −6.88 | −7.70 | −7.70 |
| −8.80 | 91 | 20 | 20 | −7.04 | −7.70 | −7.70 |
| −9.00 | 63 | 20 | 20 | −7.20 | −7.70 | −7.70 |
| −9.20 | 44 | 20 | 20 | −7.36 | −7.70 | −7.70 |

|     | ALPHA_OSA | BETA_OSA | ALPHA_lw | BETA_lw | ALPH_OSD | BETA_OSD |
|-----|-----------|----------|----------|---------|----------|----------|
| MIN | 2         | 0        | 4        | 0       | 2        | 0        |
| MID | 3         | 0        | 5        | 0       | 3        | 0        |
| MAX | 4         | 0        | 6        | 0       | 4        | 0        |

DISK DRIVE, MEDIUM AND METHOD OF COMPENSATING FOR A WRITE PARAMETER

CROSS-REFERENCE TO RELATED APPLICATIONS

This application claims the priority benefit of Korean Patent Application No. 10-2004-0079242, filed on Oct. 5, 2004, in the Korean Intellectual Property Office, the disclosure of which is incorporated herein in its entirety by reference.

BACKGROUND OF THE INVENTION

1. Field of the Invention

Embodiments of the present invention relate to a recording apparatus, medium, and method controlling a write operation of the recording apparatus, and more particularly, to a disk drive, medium, and method of compensating for a write parameter in order to prevent a weak write and an over write by taking into consideration the Thermal Pole Tip Protrusion (TPTP) characteristics of a corresponding head.

2. Description of the Related Art

A hard disk drive is a device that can be used record and/or reproduce information. The information may be written in concentric tracks on a surface of at least one magnetic write disk mounted on a spindle motor, and may be accessed by a read/write head mounted on an actuator arm, rotatable by a voice coil motor. The voice coil motor is magnetized by a current and rotates the actuator arm, thereby moving the read/write head across the disk. The read/write head can then sense changes in the magnetic field on the disk surface, thereby reading information recorded to the disk. Current can be supplied to the read/write head in order to write information to data tracks of the disk. Here, the current causes a magnetic field to magnetize particular regions of the disk surface.

The greater the capacity of a hard disk drive, the smaller permitted margin of error. In particular, over writing can become a serious problem in high density and high capacity hard disk drives. Therefore, it becomes important to precisely control the write current in a corresponding write operation.

Even though the write current may be constant while writing data to the hard disk drive, the intensity of magnetic field actually varies during the write operation as the temperature of the read/write head increases, according to the progress of the write operation. As the temperature of the read/write head increases, according to the progress of the write operation, a pole tip protrusion of a write head changes, i.e., the influence of Thermal Pole Tip Protrusion (TPTP) changes. Consequentially, the gap between the read/write head and the disk, i.e., a flying height, changes.

As the result, at the beginning of a write operation data is written with less intensity then a preferred intensity, and as time passes, data is written with gradually larger intensities.

Conventionally, since the write current is only controlled based on an operational temperature, this does not efficiently deal with the write intensity variances as write operations progress.

FIG. 1 illustrates a hard disk drive system 10. Referring to FIG. 1, the hard disk drive system 10 includes a hard disk 20 that is installed on a base 11 in a rotatable manner, and a head transfer device that transfers a head (not shown) over a desired track on the hard disk 20 in order to read/write information. The hard disk 20 can be divided into a data area 22, where information can be written, and a parking area 21 where the head may be parked when the hard disk 20 stops rotating.

The head transfer device can include a head assembly 30 that includes the head and is pivotally installed on a pivot axis 34 disposed on the base 11, and a driver 40 that pivots the head assembly 30, using an electromagnetic force, for example.

The head assembly 30 may further include a suspension 31 along an end of an actuator arm 32, which is rotatably attached to the pivot axis 34, and a head slider 50 containing the head used to read/write information to/from the hard disk 20. The head slider 50 can be installed in the suspension 31.

The head slider 50 can be biased above the hard disk 20 by the suspension 31, floating over the hard disk 20 at a certain height due to dynamic air pressure generated by the rotation of the hard disk drive 20. The height (hereinafter referred to as "flying height") of the head slider 50, floating over the hard disk 20, is based on opposing forces of the load, i.e., downward force (weight), of the suspension 31 and the lift force caused by airflow generated by the rotation of the hard disk 20.

Accordingly, the flying height denotes a gap between a read sensor, i.e., a magnetic resistance head at an end of the magnetic head slider 50, and a surface of the hard disk 20.

FIG. 2 illustrates a perspective view of a head. Referring to FIG. 2, a magnetic head 70 can include a magnetic resistance head 74 for reading from the hard disk 20, and an inductive write head for writing to the hard disk 20. The magnetic resistance head 74 senses magnetic fields of the hard disk 20. The inductive write head can include a top pole 71, a bottom pole 72, with the top pole 71 and bottom pole 72 being separated from each other by a fixed distance to form a leakage magnetic field for magnetizing a magnetic layer of the hard disk 20, and a write coil 73 to generate a magnetic field based on a supplied current, to apply a desired magnetic signal to the hard disk 20.

With the development of hard disk drives, corresponding Tracks per Inch (TPI) have increased and the width W of tracks has decreased, thereby increasing the capacity of the hard disk 20. In order to reduce the width W of track in the hard disk 20, the width of an inductive write head, to apply a magnetic signal to the tracks, should be reduced similar to the reduction in the width W of the track. Also, the flying height of the magnetic head 70 should be reduced to read the magnetic field of the written magnetic signal from the narrowed track. The flying height of the magnetic head 70 has a large influence on writing performance.

Conventionally, in order to cope with the change in coercive forces of a hard disk, due to changes in temperature, the write current can be modified, i.e., compensated, according to differences in room temperature. More specifically, the standard write current of a hard disk drive is set based on a room temperature when manufacturing the hard disk drive, and a write current is compensated according to the operating temperatures of the hard disk drive.

Although the write current can be adjusted based on the operating temperature of a hard disk drive, it is still a fact that a constant write current is still always supplied to a write head, despite of the progress of the write operation, i.e., there is no consideration taken for the length of operation. As described above, it is impossible to cope with a TPTP phenomenon where the amount of pole tip protrusion of the write head varies with the progression of the write operation.

A write magnetic head can be made up of a metal (usually, permalloy: Ni 80%/Fe 20%), and a slider to support the write magnetic head may be made up of a non-metal. Therefore, the write current flows through the metal coil, and then generates Joule heating during the write operation. However, the difference between the thermal coefficients of the metal and the non-metal causes the TPTP effect.

TPTP reduces the distance between the head and the disk (Head/Disk Interface: HDI), thereby lowering the flying height of the head. Therefore, write intensities, with respect to write currents with the same amplitude, actually differ according the degree of TPTP influence.

Accordingly, the degree of TPTP is proportional to $i^2R$. Herein, i denotes the write current that flows through the write coil, and R denotes the resistance of the write coil. The resistance is a property of the write coil and is fixed when the head is manufactured. Here, i is determined by Write Current (WC) or Over Shoot Current (OSC) used for a drive. Since the degree of TPTP is proportional to a square of i, TPTP is more sensitive to i than to R.

FIG. 3 is a cross-sectional view of a head assembly 30. Referring to FIG. 3, the head assembly 30 can include a suspension 31, attached to an end of an actuator arm 32 toward a hard disk 20, and a magnetic head slider 50, installed on the end of the suspension 31 and biased to the suspension 31 by a gimbal 36 connecting the head slider 50 to the suspension 31.

As noted above, the flying height FH of the magnetic head slider 50 depends on the lift force caused by the airflow generated by the rotation of the hard disk 20 and the bias of the suspension 31. Accordingly, the suspension 31 can stably maintain the flying height FH of the magnetic head slider 50.

As illustrated in FIG. 3, the magnetic head 70 can be located at an end of the head slider 50.

FIGS. 4A and 4B illustrate cross-sectional views of the head assembly showing the influence of TPTP. FIG. 4A illustrates the state when reading is performed, and FIG. 4B illustrates the state when writing is performed. Referring to FIGS. 4A and 4B, a write pole tip shown in FIG. 4B protrudes farther than the write pole tip shown in FIG. 4A. This protrusion of the write pole tip results from a difference between thermal coefficients of the non-metal head slider 50 and the metal magnetic head 70.

With respect to data writing of the hard disk drive, the pole tip of the write head does not protrude much initially since the write head is not heated, but, as the duration of the write operation continues, the write head becomes heated, and the pole tip of the write head protrudes farther.

The write head is not sufficiently heated, initially, resulting in a weak write, and the write head overheats as a write operation continues, resulting in an over write and potential deletion of information in adjacent tracks.

Conventionally, since the write current is controlled based on the operating temperature of the hard disk drive, changes in the writing intensity as a write operation continues are not properly dealt with.

SUMMARY OF THE INVENTION

Embodiments of the present invention set forth disk drive, medium, and method preventing a weak write upon an initial write operation of a disk drive and/or an over write operation upon continued operation of the disk drive.

To achieve the above and/or other aspects and advantages, embodiments of the present invention include a method of compensating for a write parameter to control a write operation of a disk drive, including measuring a bit error rate in an optimum write condition and a bit error rate in a weak write condition for a head of the disk drive, and generating a compensation value, for a write parameter corresponding to a difference between the bit error rate in the optimum write condition and the bit error rate in the weak write condition, to compensate the write operation of the disk drive.

There may be at least two write parameters, and the measuring of the bit error rate in the optimum write condition and the bit error rate in the weak write condition may include determining an optimum write parameter, calculating the bit error rate in the optimum write condition by writing test data using the optimum write parameter and reading the written test data, maintaining the optimum write parameter in one of the at least two write parameters, and setting another of the at least two write parameters to be a value inducing the weak write condition, calculating the bit error rate in the weak write condition by writing additional test data using the at least two parameters and reading the written additional test data, wherein the generating of the compensation value may include generating a compensation value for the optimum write parameter that corresponds to the difference between the bit error rate in the optimum write condition and the bit error rate in the weak write condition.

The generating of the compensation value for the write parameter may further include classifying a possible distribution range for the bit error rate in the optimum write condition into a plurality of ranges, searching for a distribution range of the bit error rate in the weak write condition for heads of the disk drive for each of the ranges of the bit error rate in the optimum write condition, classifying the distribution range of the bit error rates in the weak write condition, for each range of the bit error rate in the optimum write condition, into a plurality of sub-ranges, creating a compensation table indicating compensation values by allocating a compensation value to each of the sub-ranges, and obtaining a compensation value from the compensation table based on a bit error rate in the optimum condition and a bit error rate in the weak write condition.

The write parameters may be applied for a predetermined period of time after the disk drive starts a write operation.

In addition, the write parameters may include a parameter indicative to an amplitude of a write current, a parameter indicative to an amplitude of an overshoot of the write current and a parameter indicative to a duration of the overshoot.

The write parameters may be applied taking into consideration an influence of a Thermal Pole Tip Protrusion being saturated.

To achieve the above and/or other aspects and advantages, embodiments of the present invention include a medium including computer readable code to implement a method of compensating for a write parameter to control a write operation of a disk drive, the method including measuring a bit error rate in an optimum write condition and a bit error rate in a weak write condition for a head of the disk drive, and generating a compensation value, for a write parameter corresponding to a difference between the bit error rates in the optimum write condition and the bit error rate in the weak write condition, to compensate the write operation of the disk drive.

To achieve the above and/or other aspects and advantages, embodiments of the present invention include a disk drive, including a medium for storing data, a read/write head to write data to the medium through a write operation, and a controller to control the write operation by controlling the measuring of a bit error rate in an optimum write condition and a bit error rate in a weak write condition for the read/write head of the disk drive, and to control the generating of a compensation value, for a write parameter corresponding to a difference between the bit error rates in the optimum write condition and the bit error rate in the weak write condition, and to apply the compensation value, when recording data to the medium, to compensate for an influence of Thermal Pole Tip Protrusion affecting the read/write head during the write operation of the disk drive.

There may be at least two write parameters, and the controller may control the measuring of the bit error rates by determining an optimum write parameter, calculating the bit error rate in the optimum write condition by writing test data using the optimum write parameter and reading the written test data, maintaining the optimum write parameter in one of the at least two write parameters and setting another of the at least two write parameters to be a value inducing the weak write condition, calculating the bit error rate in the weak write condition by writing additional test data using the at least two parameters and reading the written additional test data, wherein the generating of the compensation value by the controller further includes generating a compensation value for the optimum write parameter that corresponds to the difference between the bit error rate in the optimum write condition and the bit error rate in the weak write condition.

The controller may further control the generating of the compensation value for the write parameter further by classifying a possible distribution range for the bit error rate in the optimum write condition into a plurality of ranges, searching for a distribution range of the bit error rate in the weak write condition for heads of the disk drive for each of the ranges of the bit error rate in the optimum write condition, classifying the distribution range of the bit error rates in the weak write condition, for each range of the bit error rate in the optimum write condition, into a plurality of sub-ranges, creating a compensation table indicating compensation values by allocating a compensation value to each of the sub-ranges, and obtaining a compensation value from the compensation table based on a bit error rate in the optimum condition and a bit error rate in the weak write condition.

The controller may include at least one medium including computer readable code to implement at least one of the controlling of the measuring of the bit error rate in the optimum write condition and the bit error rate in the weak write condition for the read/write head of the disk drive, the generating of the compensation value, for the write parameter corresponding to the difference between the bit error rates in the optimum write condition and the bit error rate in the weak write condition, applying the compensation value, when recording data to the medium, and compensating for the influence of the Thermal Pole Tip Protrusion affecting the read/write head during the write operation of the disk drive.

To achieve the above and/or other aspects and advantages, embodiments of the present invention include a disk drive, including a medium for storing data, a read/write head to write data to the medium through a write operation, and a controller means to compensate the write operation to take into consideration an influence of Thermal Pole Tip Protrusion affecting the read/write head during the write operation using a compensation value generated based on a difference between bit error rates in at least two different write conditions.

The controller means may include computer readable code to implement the generating of the compensation value.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 15 illustrates an example of a compensation table obtained when compensation values are allocated, according to an embodiment of the present invention;

DETAILED DESCRIPTION OF THE PREFERRED EMBODIMENTS

Figure 1:
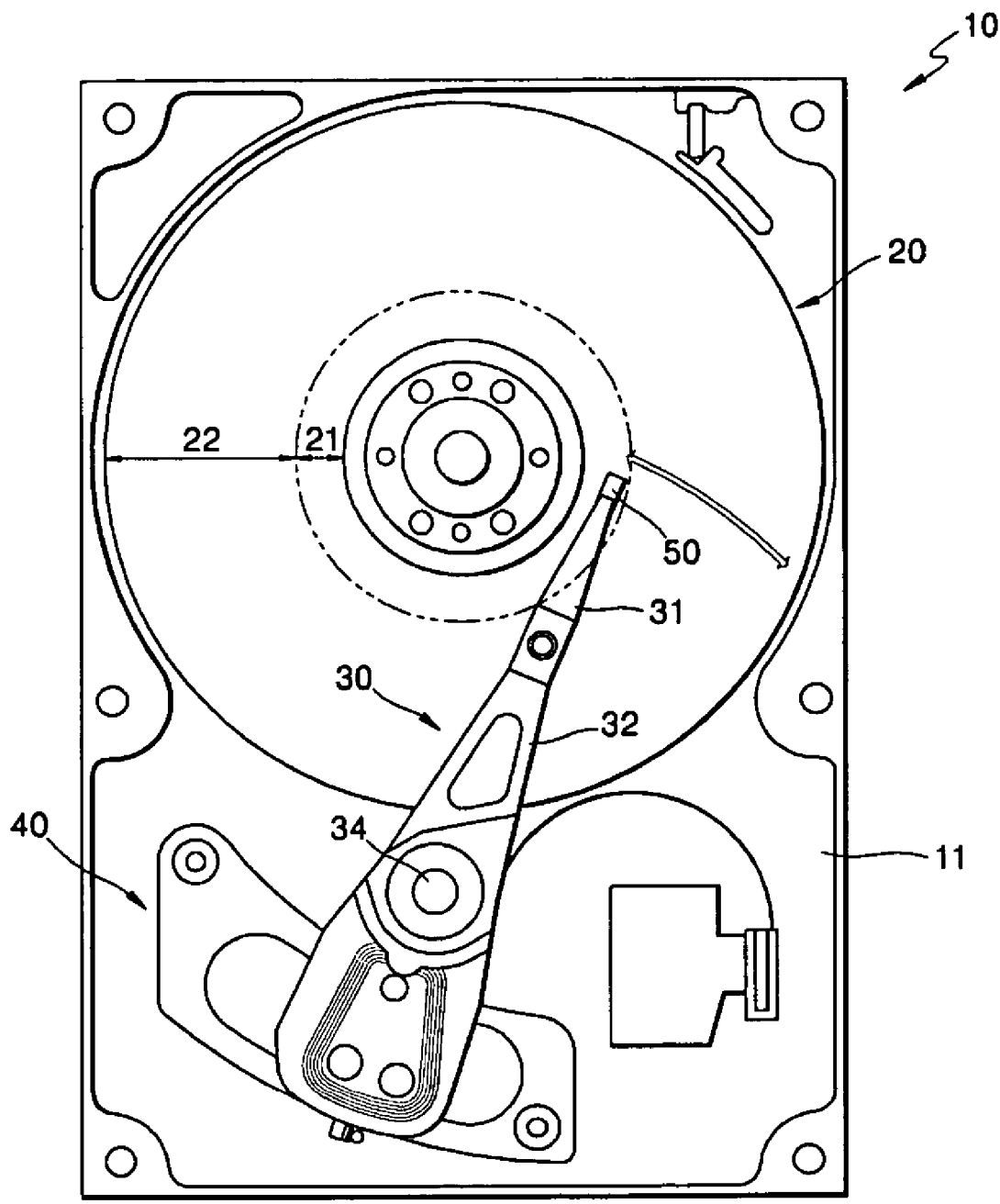
FIG. 1 illustrates a hard disk drive system.
Figure 2:
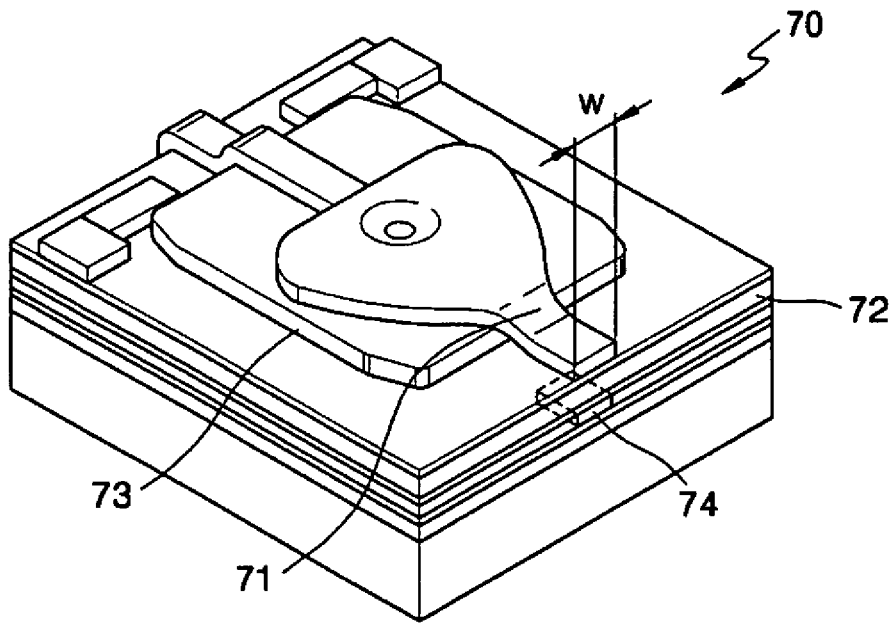
FIG. 2 illustrates a perspective view of a head.
Figure 3:
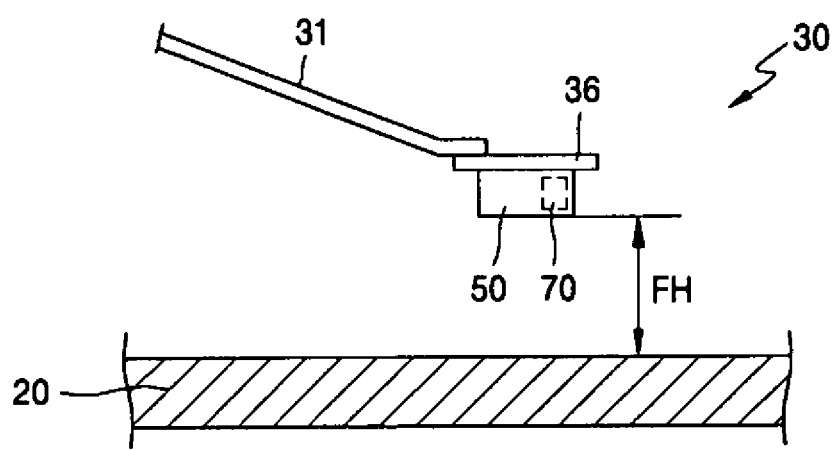
FIG. 3 illustrates a cross-sectional view of a head assembly.
Figure 4A:
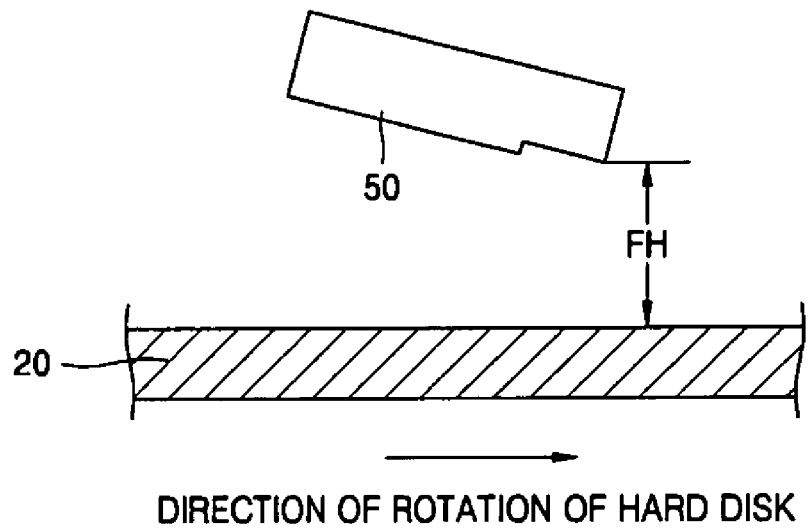
FIGS. 4A and 4B illustrate cross-sectional views of a head assembly for showing the influence of Thermal Pole Tip Protrusion (TPTP)
Figure 4B:
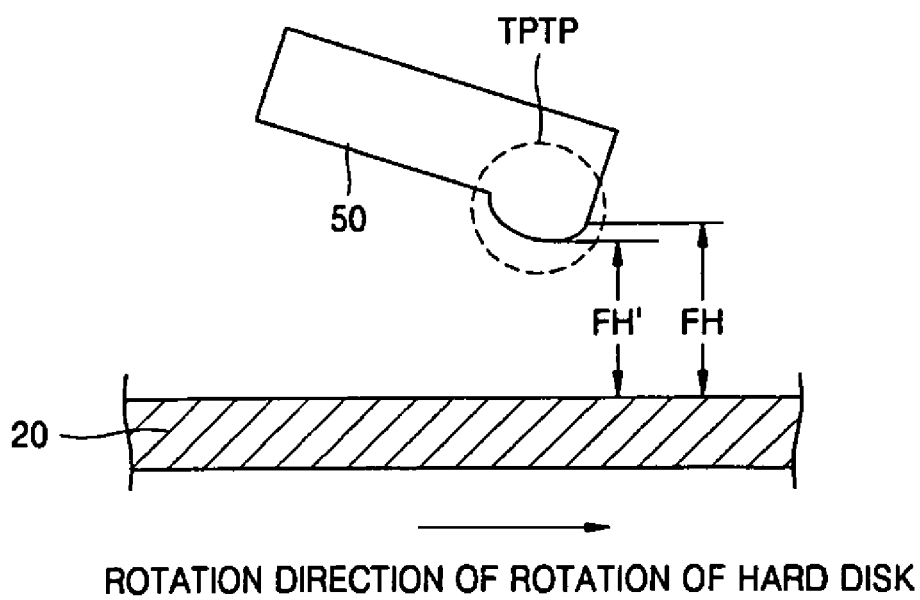

Reference will now be made in detail to embodiments of the present invention, examples of which are illustrated in the accompanying drawings, wherein like reference numerals refer to the like elements throughout. Embodiments are described below to explain the present invention by referring to the figures.

Figure 5:
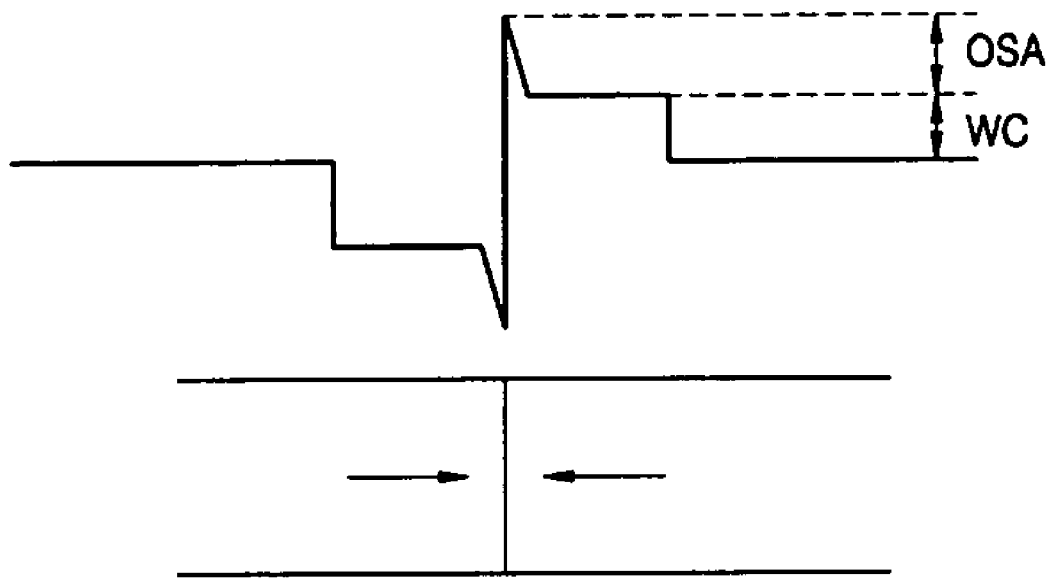
FIG. 5 illustrates a waveform diagram of a write current.

FIG. 5 illustrates a waveform diagram of a write current. Referring to FIG. 5, the write current is overshot when a data value written to a disk is changed. The amplitude of the overshoot is referred to as an OverShoot Amplitude (OSA).

The write current maintains a magnitude of the magnetic field to be more than that of the coercive force of the hard disk. The overshoot triggers an increase in strength of the magnetic field, resulting in a magnetic force greater than the coercive force of the hard disk, such that the direction of the magnetic field is changed, for a write. Therefore, the standard write current (WC) and the OSA influence the degree of TPTP during the write operation.

Figure 6:
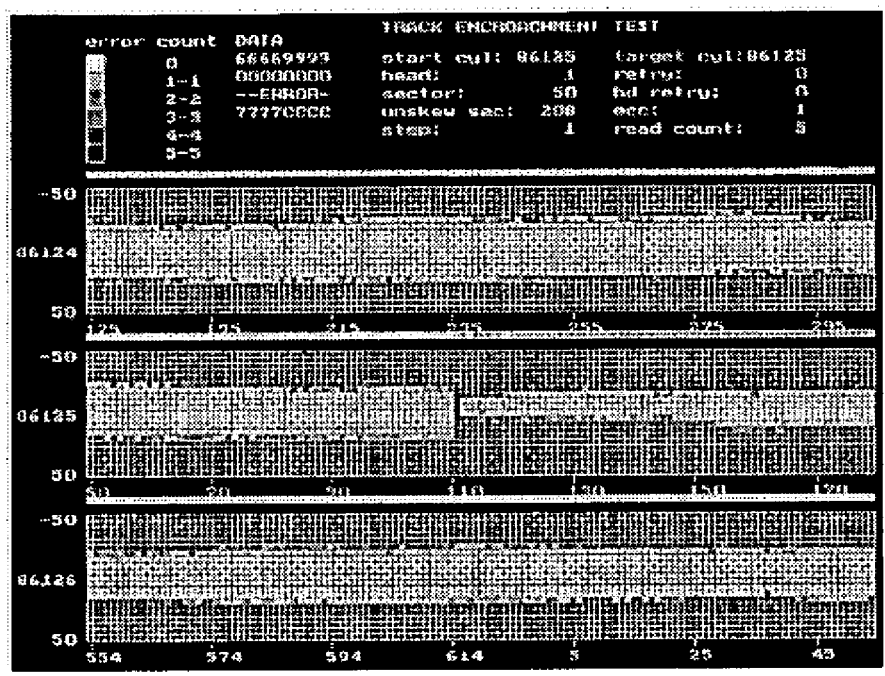
FIG. 6 illustrates a write state upon an initial state of a write operation.

FIG. 6 illustrates a write state upon an initial state of a write operation. Referring to FIG. 6, the vertical axis indicates the track number, and the horizontal axis indicates the sector number. Data can be written from a lower track to an upper track, and from a left sector to a right sector, for example. The white portion indicates the state where data is written.

Referring to FIG. 6, it can be seen that a weak write, i.e., data writing being reduced in a central portion of a middle track, occurs during an initial write operation.

Figure 7:
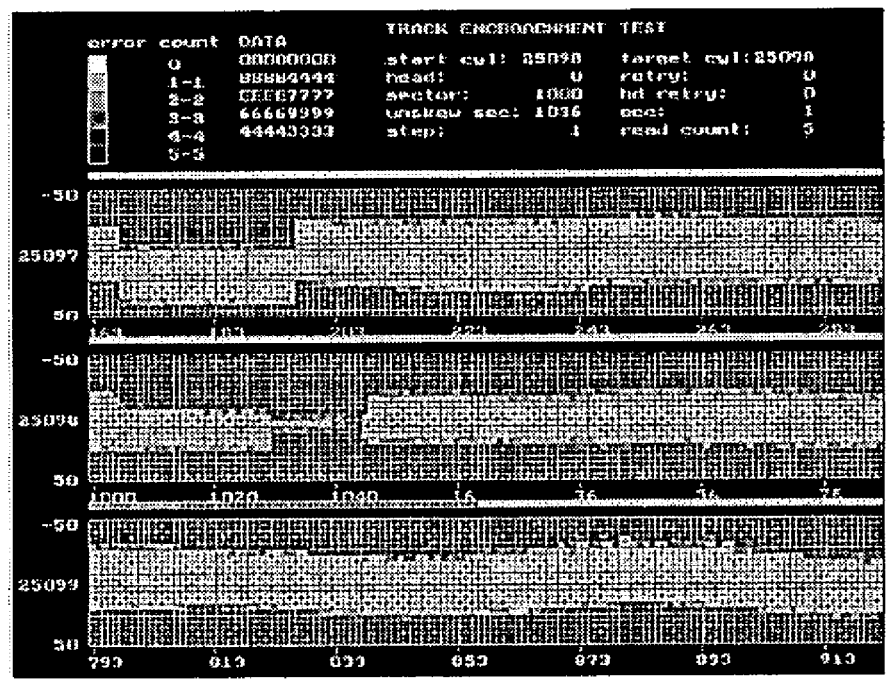
FIG. 7 illustrates a write state after a write operation progresses, when TPTP has saturated.

FIG. 7 illustrates a write state after the write operation progresses, i.e., after Thermal Pole Tip Protrusion (TPTP) has saturated. Referring to FIG. 7, the vertical axis indicates the track number, and the horizontal axis indicates the sector number. Data can be written from the lower track to the upper track, and from the left sector to the right sector, again, for example.

Referring further to FIG. 7, the middle track and the upper track have portions where data writing is reduced. This is not due to the weak write, as in the situation of FIG. 6, but due to an over write in a later written track. To be more specific, because the upper portion of a middle track and an upper track is straightly cut off, data is partially deleted from the corresponding track due to the strong magnetic field when data is written in the upper portion of the corresponding track.

To prevent the weak write and the over write, as illustrated in FIGS. 6 and 7, respectively, an embodiment of the present invention adequately controls the write current and the overshoot current as the write operation continues.

Further, an embodiment of the present invention can control the write current and the overshoot current more efficiently by taking into consideration that the TPTP characteristic affects the flying height differently depending on head characteristics and the data zone during the writing operation.

Figure 8A:
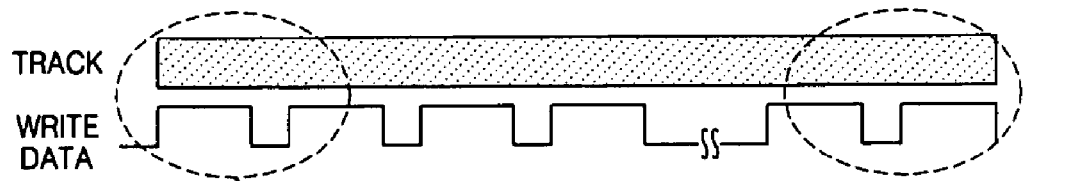
FIGS. 8A through 8D illustrate waveform diagrams for explaining principles of a method of compensating for a write parameter, according to an embodiment of the present invention.
Figure 8B:
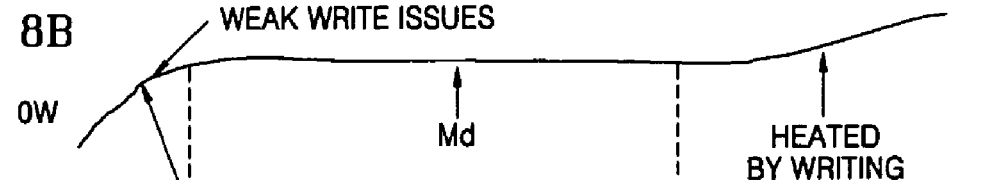
Figure 8C:
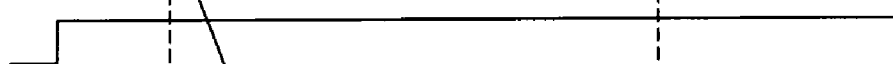
Figure 8D:
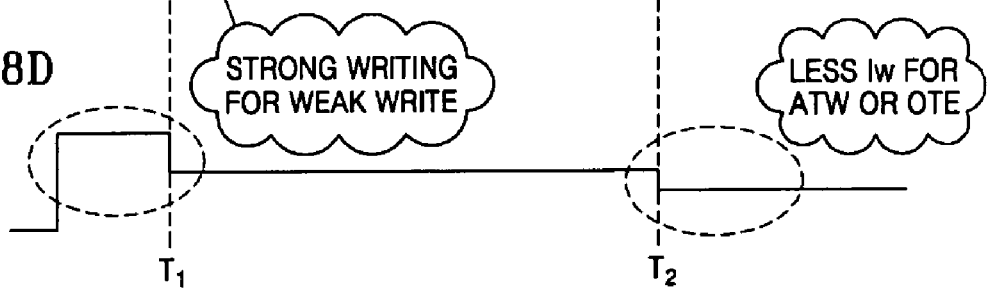

FIGS. 8A through 8D illustrate waveform diagrams for explaining principles of a method of compensating for a write parameter, according to an embodiment of the present invention. FIG. 8A illustrates a track and write data, FIG. 8B illustrates a change of magnetic field intensity in a write operation, FIG. 8C illustrates a conventional write current, and FIG. 8D illustrates a write current according to an embodiment of the present invention.

Referring to FIG. 8B, the magnetic field intensity is weak during an initial write operation, and increases as the write operation continues, until the field intensity maximizes. The write operation duration, from the time the magnetic field intensity increases again, at a point Md, which will be used as the desirable magnetic field intensity, to the time when the magnetic field intensity is maximum, is dominated by the influence of the TPTP characteristics of a head.

Therefore, it is quite probable that a weak write will occur during an initial period (up to a time T1) of a write operation, and that an over write will occurs as the write operation continues, i.e., after time T2 in FIG. 8B.

According to an embodiment of the present invention, as shown in FIG. 8D, a weak write and an over write can be prevented by increasing the write current intensity during the initial period, e.g., up to the time T1, of the write operation, and decreasing the write current after the write operation has continued a period of time, e.g., after the time T2.

Figure 9:
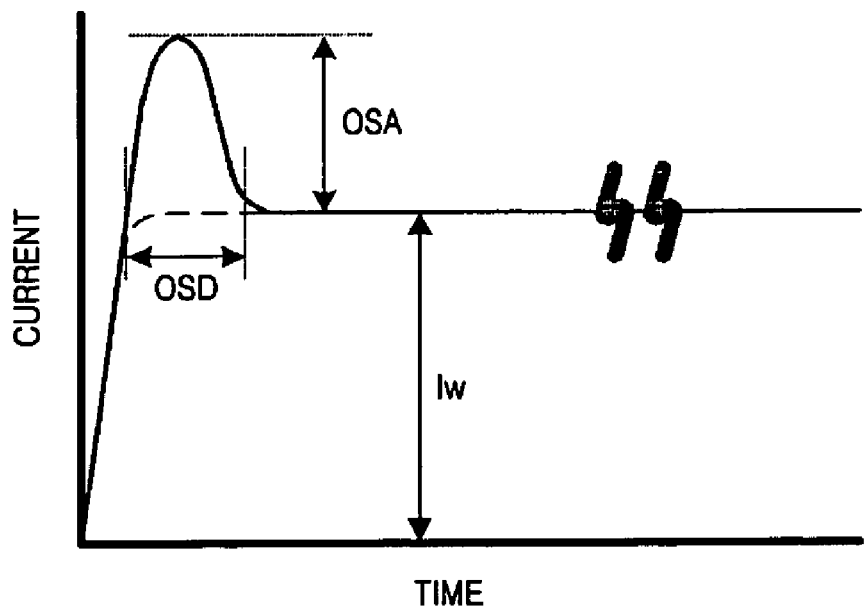
FIG. 9 illustrates a current versus time graph showing write parameters that may be used to control a write current.

FIG. 9 illustrates current versus time graph showing write parameters that may be used to control the write current. Three write parameters, used to control write current, in an embodiment of the present invention, are the OSA, Over Shoot Duration (OSD), and the standard write current (Iw).

The OSA indicates an over shoot current intensity, the OSD indicates a duration that the OSA is maintained, and Iw indicates a write current intensity after the OSD. Optimum parameters for the write operation may be obtained by using a compensation value alpha during an initial write operation, and a compensation value beta after the TPTP has saturated.

Figure 10A:
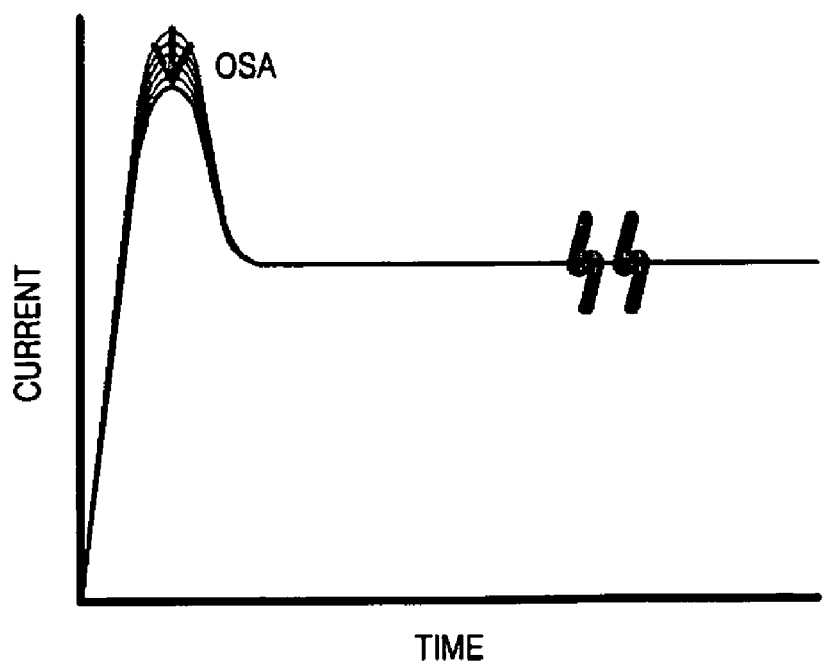
FIGS. 10A through 10C illustrate changes in a write current as OverShoot Amplitude (OSA), Over Shoot Duration (OSD), and Iw (write current) are changed.
Figure 10B:
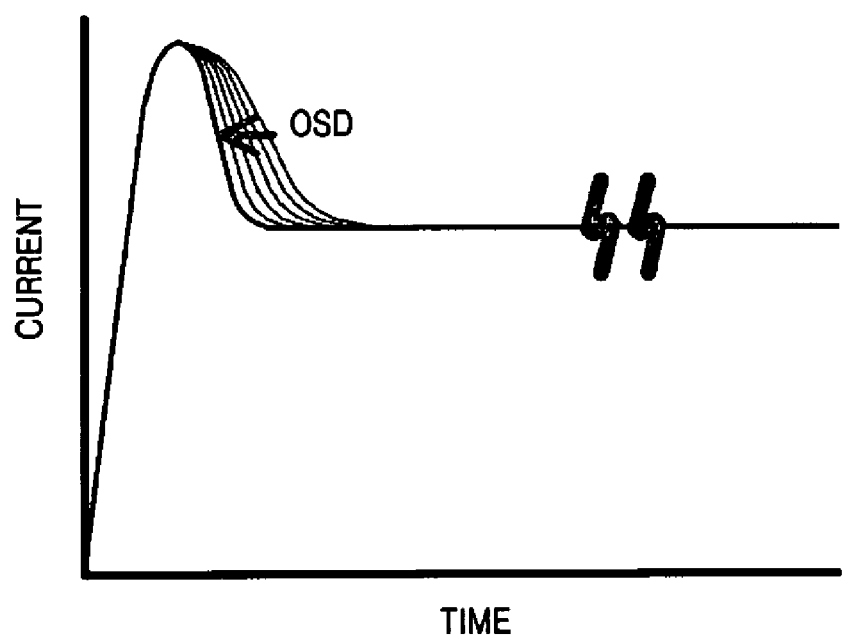
Figure 10C:
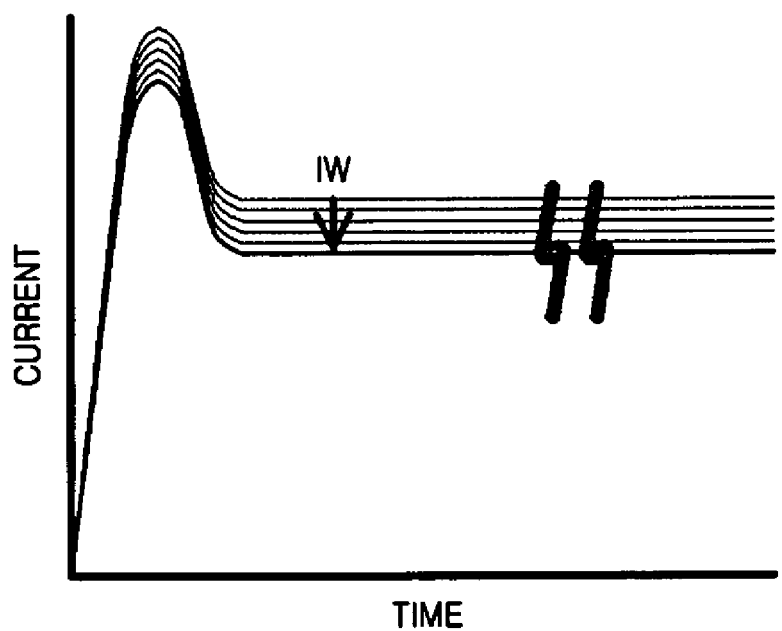

FIGS. 10A through 10C illustrate changes in write currents as OSA, OSD, and Iw are changed.

Alpha and beta may be designated based on changes in a bit error rate according to changes in a write parameter.

Figure 11:
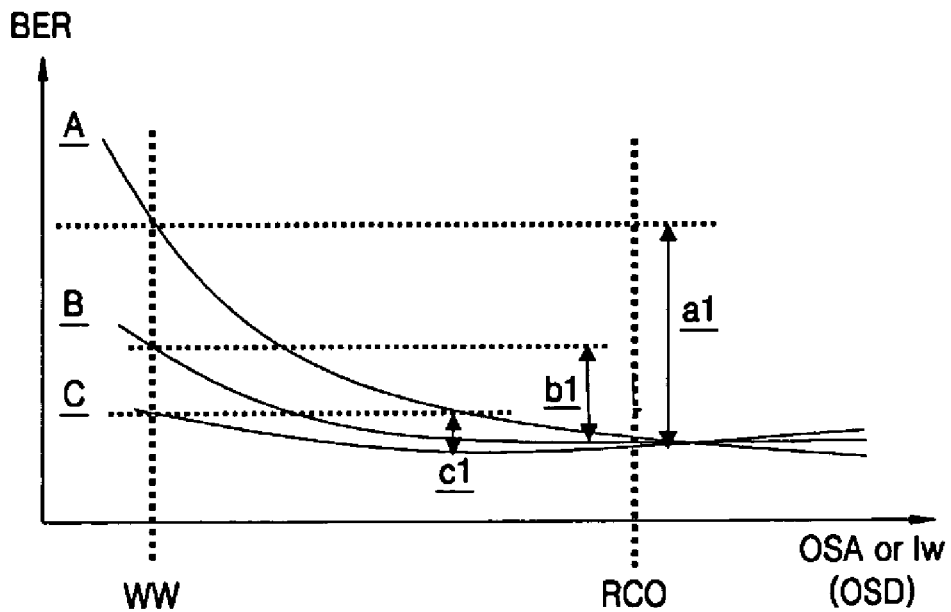
FIG. 11 illustrates a bit error versus parameter graph upon implementation of a method of determining alpha_OSA, according to a method of compensating for a write parameter, according to an embodiment of the present invention.

FIG. 11 illustrates a bit error rate versus write parameter value graph upon implementation of a method of determining alpha_OSA, according to a method of compensating for a write parameter, according to an embodiment of the present invention. FIG. 11 illustrates that, while OSA is fixed for an optimum write operation, Iw and OSD change when writing data, reading written data, and measuring a bit error rate occurring when reading data. RCO indicates a write parameter condition (hereinafter, referred to as "RCO condition") in an optimized lead channel, and WW indicates a write parameter condition (hereinafter, referred to as "WW condition") corresponding to a weak write. Under the RCO condition, the write parameters have optimum values, and under the WW condition, write parameters are deteriorated as values used to induce a weak write, except a write parameter used to measure a compensation value.

A, B, and C indicate different heads, with a1, b1, and c1, respectively, indicating differences between a bit error rate in the RCO condition (hereinafter, referred to as "RCO_BER") and a bit error rate in the WW condition (hereinafter, referred to as "WW_BER") for heads A, B, and C.

Referring to FIG. 11, the bit error rate of each head changes as Iw and OSD are changed. Considering that a weak write occurs during the initial period of a write operation, OSA should be compensated to offset a1 in order to obtain a bit error rate corresponding to the RCO condition for the head A. Likewise, OSA should be compensated to offset b1 and c1 during the initial period of write operation of heads B and C, respectively.

Therefore, a1, b1, and c1 correspond to alpha_OSA values, i.e. compensation values for heads A, B, and C, respectively, in an initial write operation with respect to Iw.

Thus, alpha_OSD and alpha-Iw can be obtained by using a method such as the method illustrated in FIG. 11. When calculating alpha_OSD, while OSD is fixed, to obtain the optimum writing condition, Iw and OSA are changed in a write test. Here, alpha_OSD can be given by the difference between a bit error rate in the RCO condition and a bit error rate in the WW condition.

When calculating alpha_Iw, while Iw is fixed, to obtain the optimum writing conditions, OSA and OSD are changed in a write test. Here, alpha_Iw can be given by the difference between a bit error rate in the RCO condition and a bit error rate in the WW condition.

The compensation values, alpha_OSA, alpha_OSD, and alpha-Iw, can be applied for a predetermined time after the write operation begins. The optimum write parameters can be applied after a predetermined time. A beta compensation value can be applied after TPTP has saturated. The alpha compensation value is used to strengthen a write parameter, whereas the beta compensation value is used to weaken a write parameter. Since overwriting occurs after TPTP has saturated, OSA, OSA, and Iw are maintained lower than in the optimum write state in order to prevent overwriting.

Since the methods of determining beta and alpha are similar, only the method of determining beta_OSA will now be described.

Figure 12:
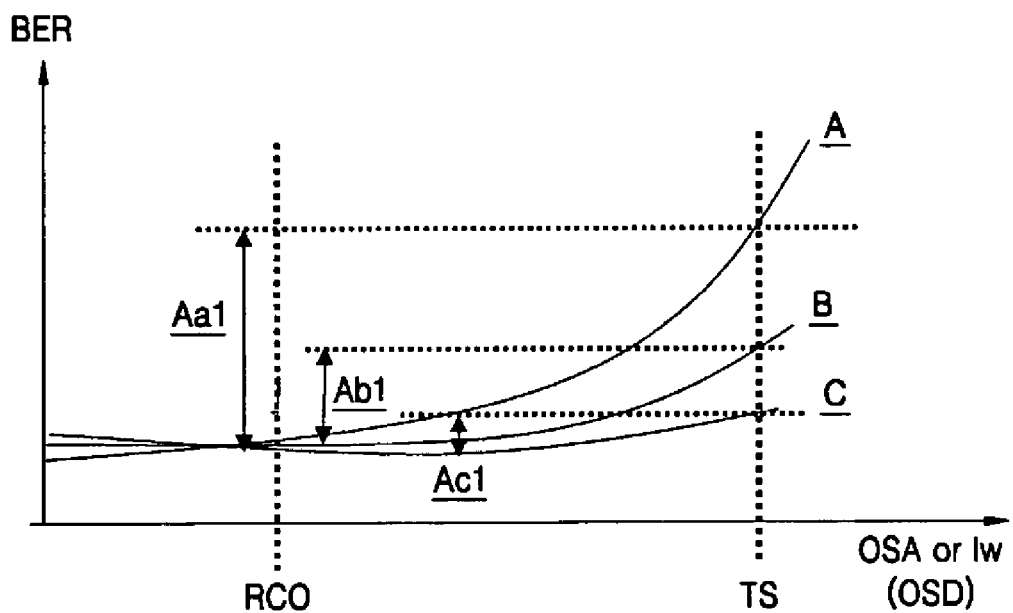
FIG. 12 illustrates a bit error versus write parameter value graph upon implementation of a method of determining beta_OSA, in the method of compensating for a write parameter, according to an embodiment of the present invention.

FIG. 12 illustrates a bit error versus write parameter value graph upon implementation of a method of determining beta_OSA, in the method of compensating for a write parameter, according to an embodiment of the present invention. Referring to FIG. 12, while OSA is fixed to obtain the optimum writing condition, Iw and OSD are changed to write data, read written data, and measure a bit error rate occurring in read data. The curves shown in FIG. 12 are obtained after TPTP has saturated.

Referring to FIG. 12, RCO indicates a write parameter condition (hereinafter, referred to as "RCO condition") in an optimized lead channel, and TS indicates a condition (hereinafter, referred to as "TS condition") in which TPTP has saturated. Under the TS condition, the write parameters have optimum values. Although writing is performed using write parameters for the optimum write conditions, the saturation of TPTP causes the flying height (FH) of a head to decrease. Accordingly, influence of the magnetic field intensity produced by a write head with respect to the disk becomes greater as TPTP becomes saturated, thereby causing the overwriting.

In FIG. 12, A, B, and C indicate different heads, with Aa1, Ab1, and Ac1, respectively, indicating the differences between a bit error rate in the RCO condition (hereinafter, referred to as "RCO_BER") and a bit error rate in the TS condition (hereinafter, referred to as "TS_BER") for heads A, B, and C.

Referring to FIG. 12, the bit error rate of each head changes as Iw and OSD are changed. Considering that an over write occurs after the influence of TPTP has saturated, OSA should be compensated to offset Aa1, in order to obtain a bit error rate corresponding to the RCO condition for the head A after the influence of TPTP for head A has saturated. Likewise, OSA should be compensated to offset Ab1 and Ac1 when the influences of TPTP for heads B and C have saturated.

Therefore, Aa1, Ab1, and Ac1 correspond to beta_OSA values, i.e. compensation values for heads A, B, and C, respectively, after the influence of TPTP for heads A, B, and C have saturated with respect to OSA.

Accordingly, beta_OSD and beta-Iw can be obtained using a method such as that shown in FIG. 12. When calculating beta_OSD, while OSD is fixed to obtain the optimum writing conditions, Iw and OSA are changed in a write test, with beta_OSD being given by the difference between a bit error rate in the RCO condition and a bit error rate in the TS condition.

When calculating beta_Iw, while Iw is fixed, to obtain the optimum writing conditions, OSA and OSD are changed in a write test, with beta_Iw being given by the difference between a bit error rate in the RCO condition and a bit error rate in the TS condition.

The BER-write parameter curves shown in FIGS. 11 and 12 can be obtained by performing a write test during a burn-in test process, for example, while write parameters are changed along a dynamic range. In a write test, test data can be written to a target track, the written data can be read from a target track, and a bit error rate occurring in the read data can be measured.

Figure 13:
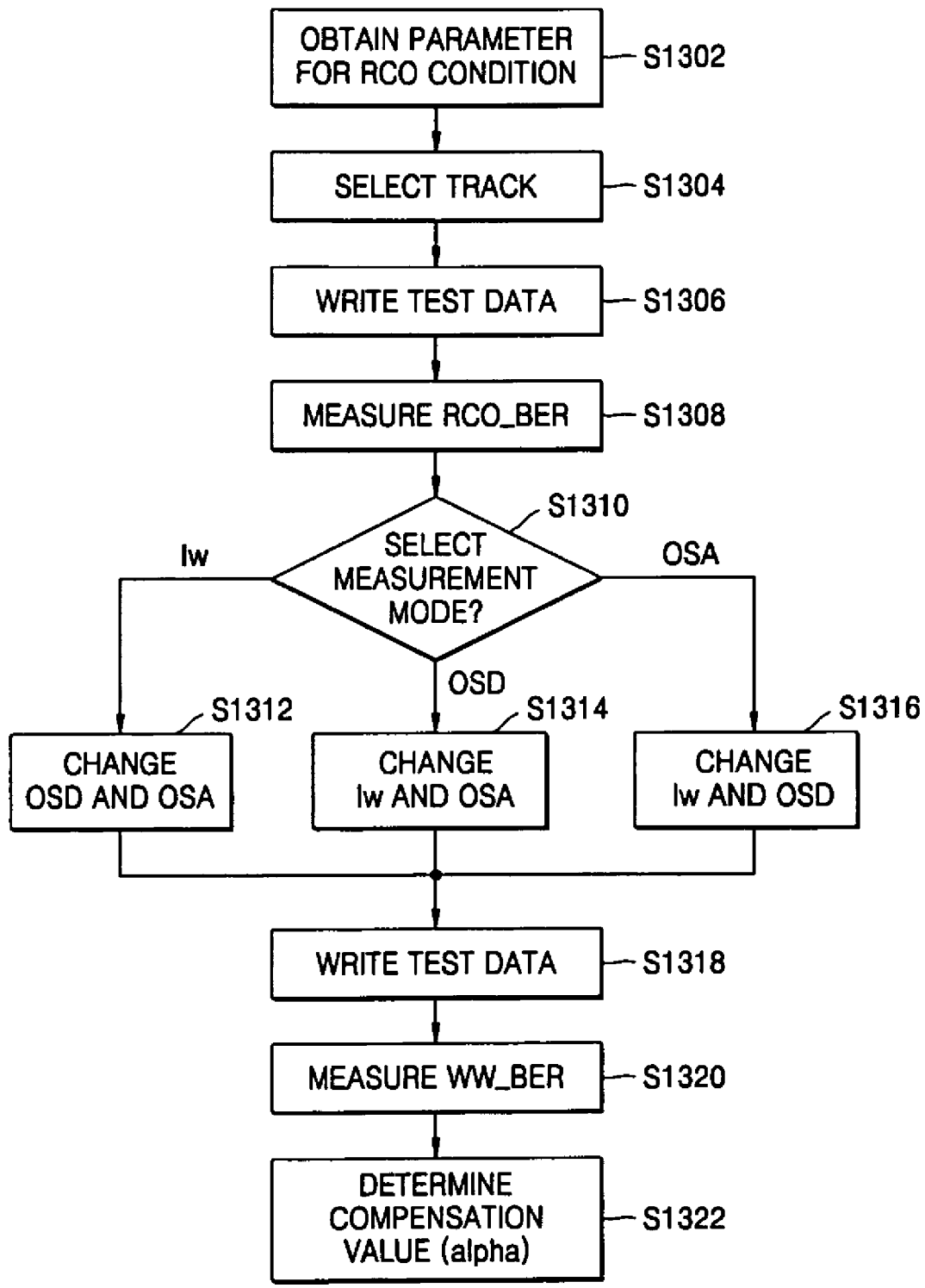
FIG. 13 illustrates a flow chart for a method of calculating a compensation value for a write parameter, in the method of compensating for a write parameter according to an embodiment of the present invention.

FIG. 13 illustrates a flow chart for a method of calculating a compensation value for a write parameter, in the method of compensating for a write parameter according to an embodiment of the present invention. Further, FIG. 13 illustrates a method of calculating alpha.

Referring to FIG. 13, a lead channel optimization can be performed to obtain the optimum write parameters for the optimum condition, in operation 1302. Here, the optimum parameters are opt_OSA, opt_OSD, and opt_Iw.

A track is selected, in operation 1304, with compensation values being set for heads and zones, and a representative track being selected for each zone.

Test data can then be written to selected tracks, in operation 1306.

A bit error rate can be measured by reading the written data, in operation 1308, with the bit error rate being referred to as RCO_BER.

A measurement mode can be selected, in operation 1310, with three measurement modes corresponding to the three write parameters, i.e., OSA, OSD, and Iw.

While maintaining the write parameter, corresponding to the selected measurement mode, at its optimum value, obtained in the lead channel optimization (operation 1302), according to a selected measurement mode, the other parameters can be changed to values under the WW condition, in operations 1312, 1314, and 1316.

For example, if a mode for measuring alpha, with respect to Iw, i.e., alpha-Iw, is selected, Iw can be maintained at the optimum value opt_Iw, obtained in the lead channel optimization, and OSA and OSD can be lowered from opt_OSA and opt_OSD to predetermined values and can be set to values satisfying the WW condition. OSA and OSD can be lowered appropriately according to test results and statistics.

Test data can be written in a target track according to the adjusted write parameters, in operation 1318.

A bit error rate can be measured by reading the written test data, in operation 1320, with the bit error rate being referred to as WW_BER.

A difference between RCO_BER and WW_BER can be calculated and a compensation value corresponding to the difference can be determined, in operation 1322. The compensation value corresponding to the difference can be determined, in part, by statistics regarding many heads, for example, with a compensation value being prepared with reference to a compensation table and a standard table as described below, for example.

Figure 14:
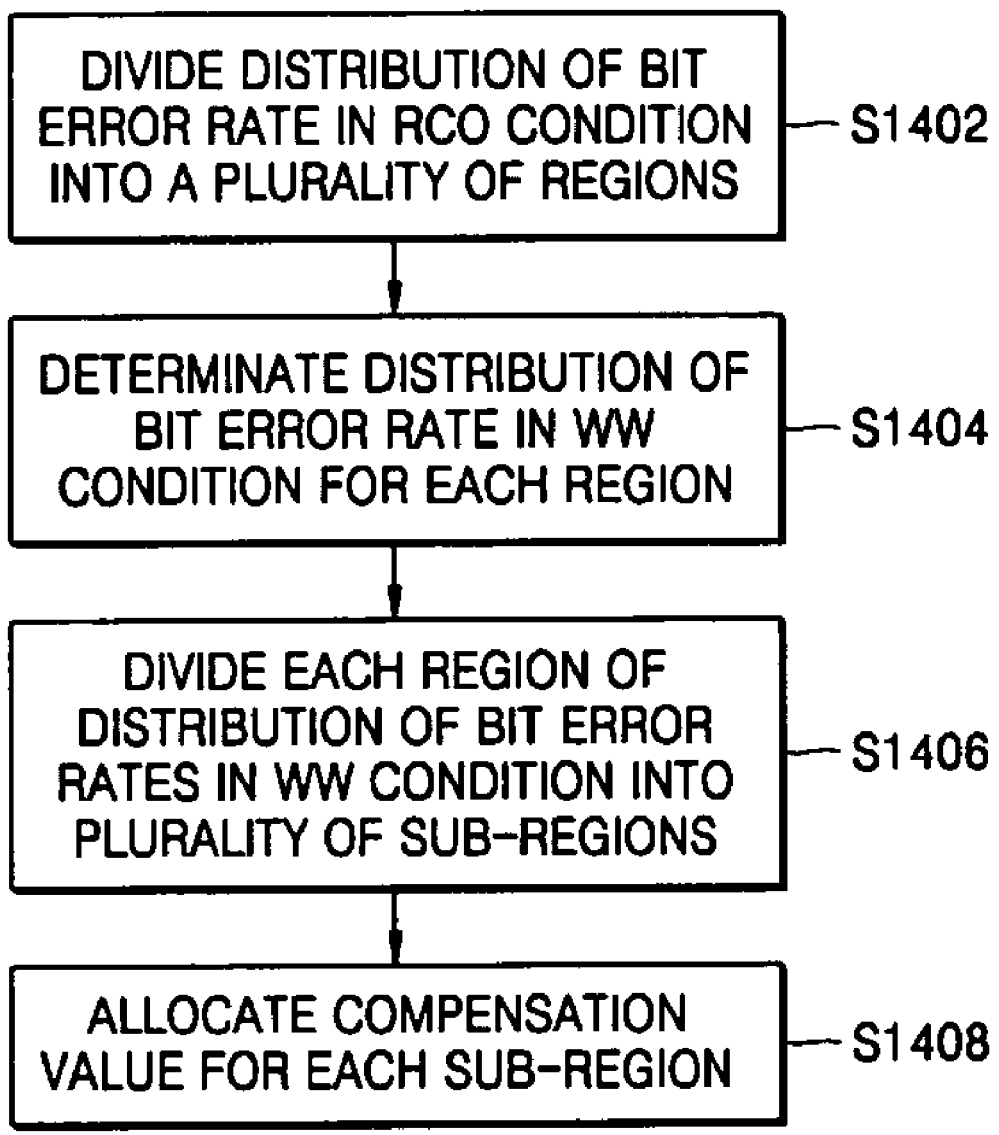
FIG. 14 illustrates a flow chart for a method of preparing a compensation table used to obtain a compensation value, e.g., in operation 1322 in FIG. 13, according to an embodiment of the present invention.

FIG. 14 illustrates a flow chart for a method of preparing a compensation table used to obtain a compensation value, e.g., in operation 1322 of FIG. 13, according to an embodiment of the present invention.

Referring to FIG. 14, a possible distribution range of a bit error rate of a hard disk drive in the RCO condition can be divided into a plurality of regions, in operation 1402. The possible distribution range of a bit error rate in the RCO condition can be determined by heads measured to obtain a compensation value, and can be divided into a plurality of regions at regular intervals.

The distribution range of a bit error rate in a weak write condition can be searched for each of the divided regions, with respect to heads, having a bit error rate satisfying the optimum condition of each divided region, in operation 1404. That is, bit error rates can be measured and distribution ranges of measured bit error rates can be determined for heads in each of the divided regions having the bit error rate measured in the RCO condition to calculate a beta compensation value (a bit error rate in the TS condition can be used instead of a bit error rate in the WW condition).

Under the WW condition, the distribution range of the bit error rate of heads in each region is divided into a plurality of sub-regions, in operation 1406. In particular, each of the distribution ranges obtained in operation 1404 can be classified into high, middle, and low ranges. In practice, OSA, OSD, and Iw can be control values used by a preamplifier that generates the write current applied to a write head. The control values can be digitally expressed, and thus, the alpha values can also be expressed digitally. Therefore, an alpha value corresponding to a difference between RCO_BER and WW_BER should not be determined linearly (as an analog value) but as a digital value, according to an embodiment of the present invention, though embodiments of the present invention are not limited thereto. Accordingly, it is useful to determine to which sub-region the difference between RCO_BER and WW_BER belongs, and to determine the compensation value for each sub-region.

The compensation value for each sub-region can then be allocated, in operation 1408.

A possible distribution range of a bit error rate, a distribution range of a bit error rate in the WW condition of each region, and a compensation table indicating compensation values can thus be obtained, in operation 1408.

FIG. 15 illustrates an example of a compensation table obtained when compensation values are allocated, such as that of operation 1408 in FIG. 14. Referring to FIG. 15, the column 1502 indicates a possible range of a bit error rate under the RCO condition and divided regions, columns 1504 indicate an error count criteria in each divided region, and columns 1506 indicate a range of a bit error rate for each of the divided regions, under the WW condition and divided sub-ranges.

In the embodiment of FIG. 15, in column 1502, the bit error rates can be divided into intervals of 0.2 ranging from 3.62 to 9.20. Further, in a row 1508, bit error rates under the WW condition ranging from −3.68 to −4.46 correspond to a bit error rate under the RCO condition ranging from −5.00 to −4.60.

Additionally, in this embodiment, bit error rates under the WW condition ranging from −4.46 to −3.68 may be obtained by measuring bit error rates of heads having bit error rates measured in the RCO condition ranging from −5.00 to −4.60. A high range, a middle range, and a low range into which the range of bit errors under the WW can be divided are 3.84, −4.32, and −4.66.

In the columns 1504 and 1506, of the compensation table of FIG. 15, hatched values may not be compensated since the values are identical to each other, i.e., hatched values have the compensation value 0.

According to an embodiment of the present invention, and referring to the compensation table of FIG. 15, the compensation value can be calculated as follows:

If RCO_BER>WW_max, alpha=max;
elseif; RCO_BER>WW_mid, alpha=mid;
elseif; RCO_BER>WW_min, alpha=min;
else alpha=0.

For example, when a bit error rate of a head ranging from −5.00 to −4.60, measured in the RCO condition, and a bit error rate measured in the WW condition is 4.44, the compensation value alpha of the head can be set to the middle value according to the above condition.

Figures 16, 17:
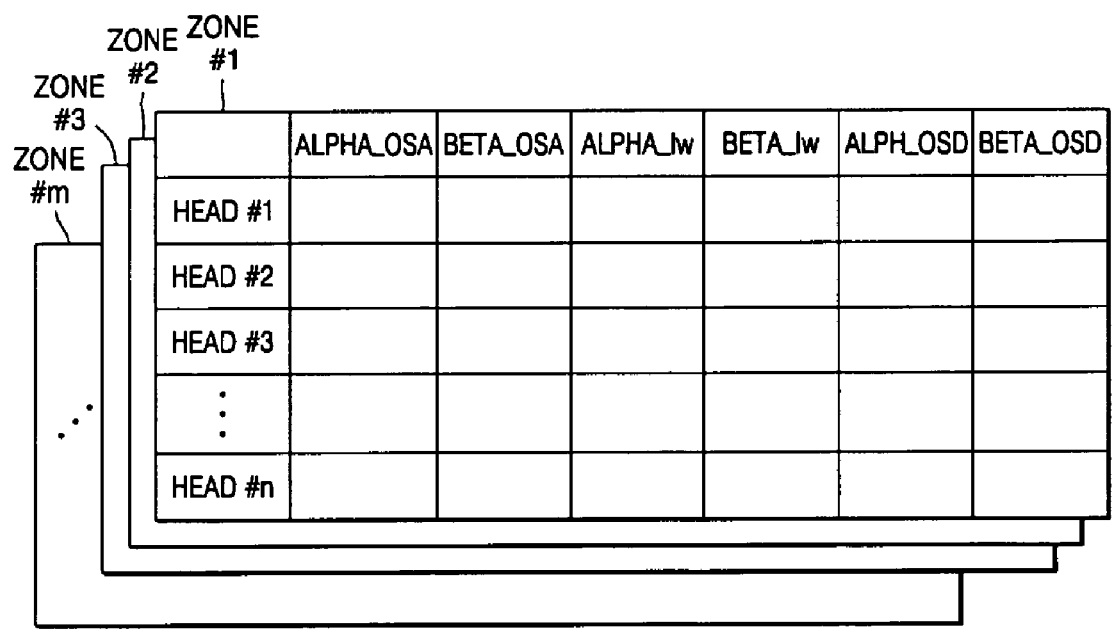
FIG. 16 illustrates a table showing an example of min, mid, and max.
FIG. 17 illustrates an example of compensation tables, by zones, organized according to heads upon implementation of a method of calculating a compensation value for a write parameter, according to an embodiment of the present invention.

FIG. 16 illustrates a table showing an example of minimum, middle, and maximum values, with the table shown in FIG. 16 including values determined through testing and statistics of many heads, for example.

FIG. 17 illustrates an example of compensation tables, by zones, and organized according to heads obtained using a method of calculating a compensation value for a write parameter, according to an embodiment of the present invention. Referring to FIG. 17, the compensation tables may be stored in a maintenance cylinder or nonvolatile memory such as a disk, for example.

Figure 18:
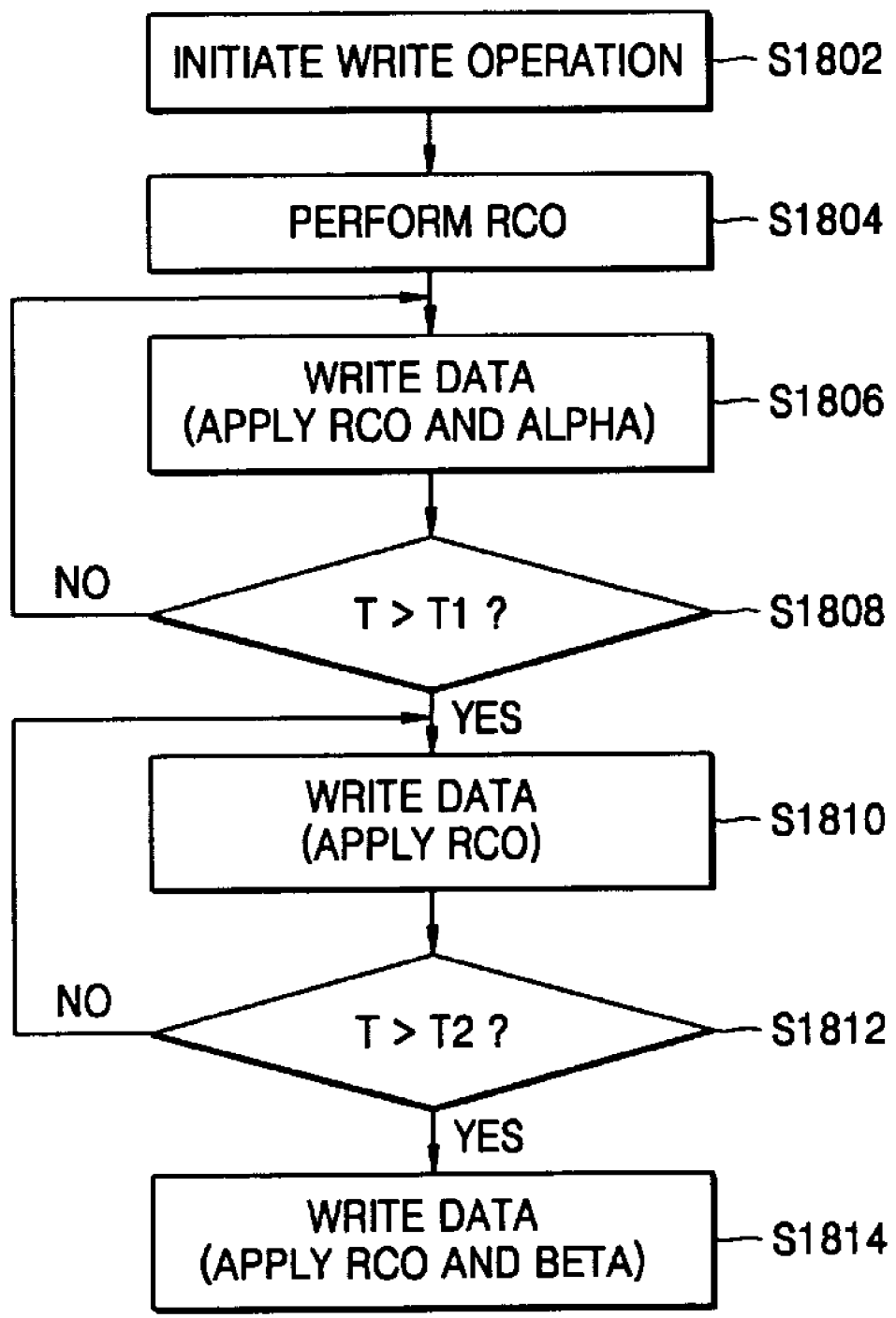
FIG. 18 illustrates a flow chart showing the method of compensating for a write parameter, according to an embodiment of the present invention.

FIG. 18 illustrates a flow chart showing the method of compensating for a write parameter, according to an embodiment of the present invention.

Referring to FIG. 18, a write operation can be initiated, in operation 1802, and a hard disk drive can perform lead channel optimization to optimize write parameters, in operation 1804. More specifically, an operating temperature of the hard disk drive can be measured and a compensation value can be obtained to set the optimum write parameters by compensating the standard parameter, obtained at room temperature, based on the measured operating temperature.

A write operation can be performed for a predetermined time T1, using a compensation value alpha, in operations 1806 and 1808. More specifically, after the write operation starts, the hard disk drive can apply the compensation value alpha to the optimum write parameter of operation 1804, using tables shown in FIG. 15 stored in a maintenance cylinder of the hard disk drive, for example, until the time Tx.

When the time T1 occurs, the write operation can be performed using the optimum write parameter, in operations 1810 and 1812.

When the time T2 occurs, i.e., the influence of TPTP has saturated, the write operation can be performed by applying a compensation value beta to the optimum write parameter of operation 1804, in operation 1814. More specifically, the hard disk drive can perform a write operation by applying a compensation value beta to the optimum write parameter, with reference to the tables shown in FIG. 17 stored in the maintenance cylinder of the hard disk drive, for example, after the time T2.

Figure 19:
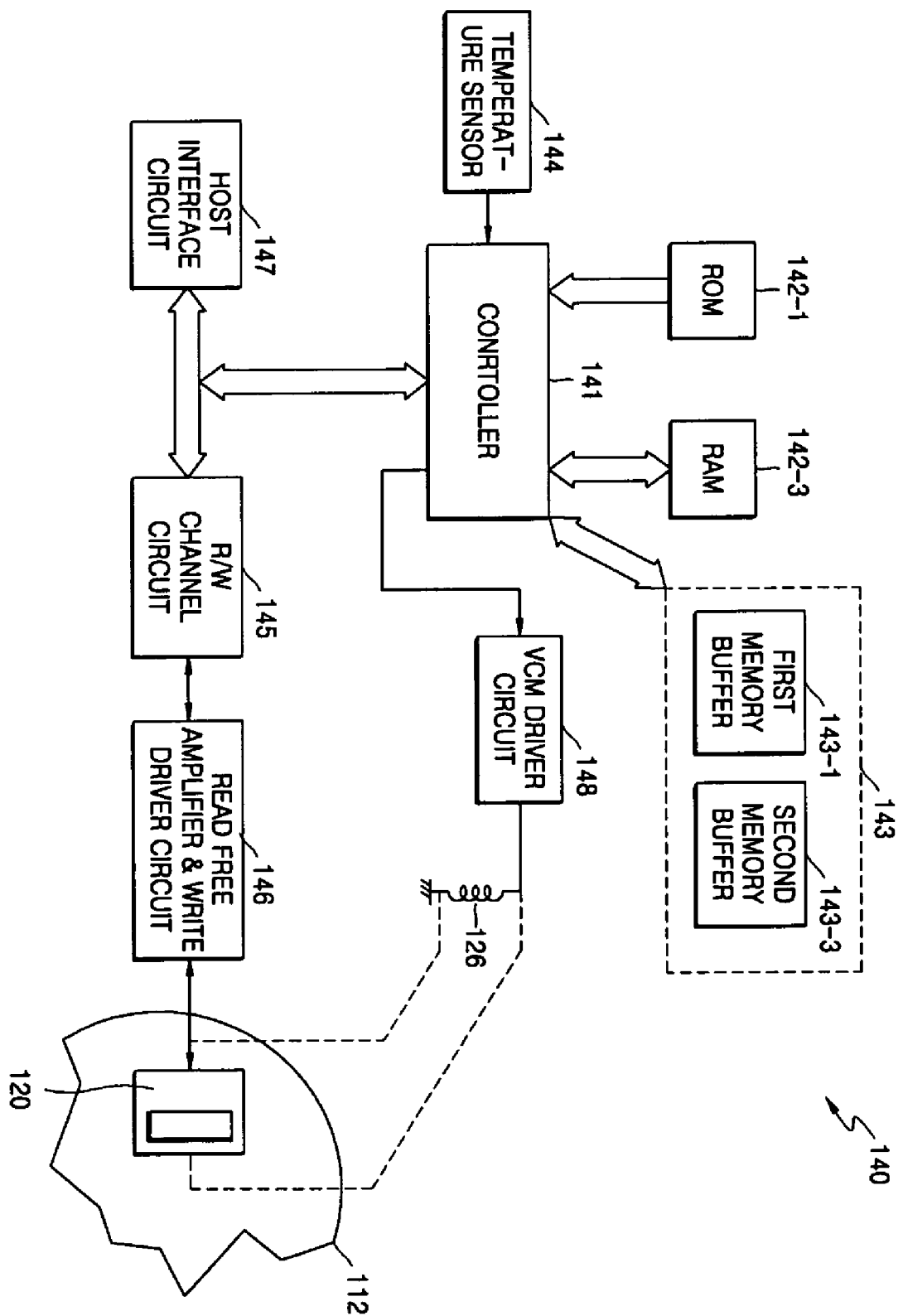
FIG. 19 illustrates a hard disk drive, according to an embodiment of the present invention.

FIG. 19 illustrates a hard disk according to an embodiment of the present invention.

Referring to FIG. 19, a control device 140 can include a controller 141, connected to a head 120 via a R/W channel circuit 145 and a read free amplifier & write driver circuit 146. The controller 141 can be realized by a Digital Signal Processor (DSP), a microprocessor, or a micro controller, for example.

The controller 141 can supply a control signal to the R/W channel circuit 145 in order to read data from a disk 112 or write data to the disk 112. A write parameter can be set using a temperature sensed by a temperature sensor 144 and a compensation value according to an embodiment of the present invention.

Information can be transferred to a host interface circuit 147 from the R/W channel circuit 145. The host interface circuit 147 can include a control circuit that allows interfacing with systems such as personal computers.

The R/W channel circuit 145 can modulate an analog signal read by the head 120 and amplified by the read free amplifier & write driver circuit 146, in a reproducing mode, to a digital signal that can be read by a host computer (not shown) and outputs the digital signal to the host interface circuit 147. The R/W channel circuit 145 can receive user data from the host computer, via the host interface circuit 147, convert the user data into a write current that can be used to write to the disk 112, and output the write current to the read free amplifier & write driver circuit 146.

The controller 141 can be connected to a VCM driver circuit 148 that supplies a driver current to a voice coil 126, and can further supply a control signal to the VCM driver circuit 148 to control excitation of a VCM (not shown) and movement of the head 120.

The controller 141 can be connected to a nonvolatile memory, such as a Read Only Memory (ROM), a flash memory device 142-1, or a volatile memory such as a Random Access Memory (RAM) device 142-3, for example. The memory devices 142-1 and 142-3 can store commands and data used by the controller 141 in order to implement computer readable code, e.g., perform a software routine.

The computer readable code may include a seek instruction, e.g., routine, to move a head from one track to another track, and a following instruction, e.g., routine, to seek for a target sector in a track. A seek routine can include a servo control routine guaranteeing that the head moves to a specific track.

Computer readable code, e.g., an instruction or program, may set a write parameter based on the temperature of the hard disk drive and the starting of the write operation, stored in the memory devices 142-1 and 142-3. The controller 141 can set a write parameter according to the temperature sensed by the temperature sensor 144, the starting of the write operation, whether the influence of the TPTP has saturated, and the location of the head when current is supplied.

A buffer memory 143 may store write data in a first buffer memory 143-1 when the hard disk drive receives a write command from the host computer, for example. A second buffer memory 143-3 may temporarily store data reproduced from the disk 112, for example.

When the hard disk drive 140 receives the write command from the host computer, the write data can be stored in the first buffer memory 143-1. The temperature sensor 144 may receive a control signal of the controller 141, and can then sense the temperature of the hard disk drive.

The controller 141 determines whether the temperature measured by the temperature sensor 144 falls in a high temperature range or a low temperature range. Depending of whether the measured temperature falls in a high temperature range or a low temperature range, the controller 141 may compensate a write parameter by referring to write parameter compensation values (alpha and beta) stored in the maintenance cylinder in high temperature and low temperature, heads, and zones.

The write parameter may be compensated using a compensation value based on the temperature, and a compensation value alpha until the time T1 after the beginning of the write operation.

In addition, the write parameter may be compensated using a compensation value based on the temperature after the time T1.

Here, the write parameter may be compensated using a compensation value based on the temperature and a compensation value beta, after the influence of the TPTP has saturated.

After the write parameter is compensated, the controller 141 can apply the write parameter to the head 120 when the head 120 writes to the disk 112.

In addition, according to an embodiment of the present invention, a Channel Statistical measurement (CSM) or a total number of bit errors may be used, in addition to a bit error rate. The CSM, which is one of the indices indicating an error rate of data read from a disk, checks a bit error provided in a channel chip, which reduces the measurement time compared to the BER. The CSM and BER have a log arithmetic relation.

Further, it is possible for embodiments of the present invention to be realized on a medium, e.g., a computer-readable recording medium, as computer readable code. Media may include every kind of recording/transferring device/unit that can stores/transfer computer system-readable data. Accordingly, ROMs, RAMs, CD-ROMs, magnetic tapes, floppy discs, optical data storage, etc. may be used as the medium/media. The media can also be realized in the form of a carrier wave (e.g., transmission through Internet), for example. Further examples of media may include electronic circuits, semiconductor memory device, flash memory, erasable read-only memory (ROM), floppy disks, optical data storage devices, hard disks, optical fiber medium, radio frequency (RF), etc, for example. Such computer data signals may include any signals that can be stored/transmitted on/over electronic network channels, optical fibers, electronic fields, RF networks, etc., for example In a method of calculating a compensation value for a write parameter, according to an embodiment of the present invention, a compensation value alpha can be produced to compensate a write parameter until a predetermined time T1 has occurred, from the start of a write operation, thereby preventing a weak write phenomenon in an initial write operation.

In a method of calculating a compensation value for a write parameter, a compensation value beta can be produced to compensate a write parameter after the influence of TPTP has saturated, thereby preventing an over write phenomenon after the maximization of the TPTP influence.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of compensating for a write parameter to control a write operation of a disk drive, comprising:
    measuring a bit error rate in an optimum write condition and a bit error rate in a weak write condition for a head of the disk drive; and
    generating a compensation value, for a write parameter corresponding to a difference between the bit error rate in the optimum write condition and the bit error rate in the weak write condition, to compensate the write operation of the disk drive,
    wherein there are at least two write parameters, and the measuring of the bit error rate comprises:
        determining an optimum write parameter;
        calculating the bit error rate in the optimum write condition by writing test data using the optimum write parameter and reading the written test data;
        maintaining the optimum write parameter in one of the at least two write parameters and setting another of the at least two write parameters to be a value inducing the weak write condition;
        calculating the bit error rate in the weak write condition by writing additional test data using the at least two parameters and reading the written additional test data,
    wherein the generating of the compensation value comprises:
        generating a compensation value for the maintained write parameter that corresponds to the difference between the bit error rate in the optimum write condition and the bit error rate in the weak write condition.

2. The method of claim 1, wherein the generating of the compensation value for the write parameter further comprises:
    classifying a possible distribution range for the bit error rate in the optimum write condition into a plurality of ranges;

searching for a distribution range of the bit error rate in the weak write condition for heads of the disk drive for each of the ranges of the bit error rate in the optimum write condition;

classifying the distribution range of the bit error rates in the weak write condition, for each range of the bit error rate in the optimum write condition, into a plurality of sub-ranges;

creating a compensation table indicating compensation values by allocating a compensation value to each of the sub-ranges; and obtaining a compensation value from the compensation table based on a bit error rate in the optimum condition and a bit error rate in the weak write condition.

3. The method of claim 1, wherein write parameters are applied for a predetermined period of time after the disk drive starts a write operation.

4. The method of claim 3, wherein the write parameters includes a parameter indicative to an amplitude of a write current, a parameter indicative to an amplitude of an overshoot of the write current, and a parameter indicative to a duration of the overshoot.

5. The method of claim 1, wherein write parameters are applied after Thermal Pole Tip Protrusion of the head is saturated.

6. The method of claim 5, wherein the write parameters are a write current intensity parameter, an over shoot of write current parameter, and an over shoot duration parameter.

7. A medium comprising computer readable code to implement a method of compensating for a write parameter to control a write operation of a disk drive, the method comprising:

measuring a bit error rate in an optimum write condition and a bit error rate in a weak write condition for a head of the disk drive; and generating a compensation value, for a write parameter corresponding to a difference between the bit error rates in the optimum write condition and the bit error rate in the weak write condition, to compensate the write operation of the disk drive, wherein there are at least two write parameters, with the measuring of the bit error rates comprising:

determining an optimum write parameter;

calculating the bit error rate in the optimum write condition by writing test data using the optimum write parameter and reading the written test data;

maintaining the optimum write parameter in one of the at least two write parameters and setting another of the at least two write parameters to be a value inducing the weak write condition;

calculating the bit error rate in the weak write condition by writing additional test data using the at least two parameters and reading the written additional test data, wherein the generating of the compensation value comprises:

generating a compensation value for the optimum write parameter that corresponds to the difference between the bit error rate in the optimum write condition and the bit error rate in the weak write condition.

8. The medium of claim 7, wherein the generating of the compensation value for the write parameter further comprises:

classifying a possible distribution range for the bit error rate in the optimum write condition into a plurality of ranges;

searching for a distribution range of the bit error rate in the weak write condition for heads of the disk drive for each of the ranges of the bit error rate in the optimum write condition;

classifying the distribution range of the bit error rates in the weak write condition, for each range of the bit error rate in the optimum write condition, into a plurality of sub-ranges;

creating a compensation table indicating compensation values by allocating a compensation value to each of the sub-ranges; and obtaining a compensation value from the compensation table based on a bit error rate in the optimum condition and a bit error rate in the weak write condition.

9. A disk drive, comprising:

a medium for storing data;

a read/write head to write data to the medium through a write operation; and a controller to control the write operation by controlling the measuring of a bit error rate in an optimum write condition and a bit error rate in a weak write condition for the read/write head of the disk drive, and to control the generating of a compensation value, for a write parameter corresponding to a difference between the bit error rates in the optimum write condition and the bit error rate in the weak write condition, and to apply the compensation value, when recording data to the medium, to compensate for an influence of Thermal Pole Tip Protrusion affecting the read/write head during the write operation of the disk drive, wherein there are at least two write parameters, and the controller controls the measuring of the bit error rates by determining an optimum write parameter, calculating the bit error rate in the optimum write condition by writing test data using the optimum write parameter and reading the written test data, maintaining the optimum write parameter in one of the at least two write parameters and setting another of the at least two write parameters to be a value inducing the weak write condition, calculating the bit error rate in the weak write condition by writing additional test data using the at least two parameters and reading the written additional test data, wherein the generating of the compensation value by the controller further comprises generating a compensation value for the optimum write parameter that corresponds to the difference between the bit error rate in the optimum write condition and the bit error rate in the weak write condition.

10. The disk drive of claim 9, wherein the controller controls the generating of the compensation value for the write parameter further by classifying a possible distribution range for the bit error rate in the optimum write condition into a plurality of ranges, searching for a distribution range of the bit error rate in the weak write condition for heads of the disk drive for each of the ranges of the bit error rate in the optimum write condition, classifying the distribution range of the bit error rates in the weak write condition, for each range of the bit error rate in the optimum write condition, into a plurality of sub-ranges, creating a compensation table indicating compensation values by allocating a compensation value to each of the sub-ranges, and obtaining a compensation value from the compensation table based on a bit error rate in the optimum condition and a bit error rate in the weak write condition.

11. The disk drive of claim 9, wherein the controller comprises at least one medium comprising computer readable code to implement at least one of the controlling of the measuring of the bit error rate in the optimum write condition and the bit error rate in the weak write condition for the read/write head of the disk drive, the generating of the compensation value, for the write parameter corresponding to the difference between the bit error rates in the optimum write condition and the bit error rate in the weak write condition, applying the compensation value, when recording data to the medium, and compensating for the influence of the Thermal Pole Tip Protrusion affecting the read/write head during the write operation of the disk drive.

* * * * *